F. H. LOVERIDGE.
PRESSURE GAGE FOR STEAM BOILERS.
APPLICATION FILED MAY 10, 1915.
1,260,925.
Patented Mar. 26, 1918.
3 SHEETS—SHEET 1.
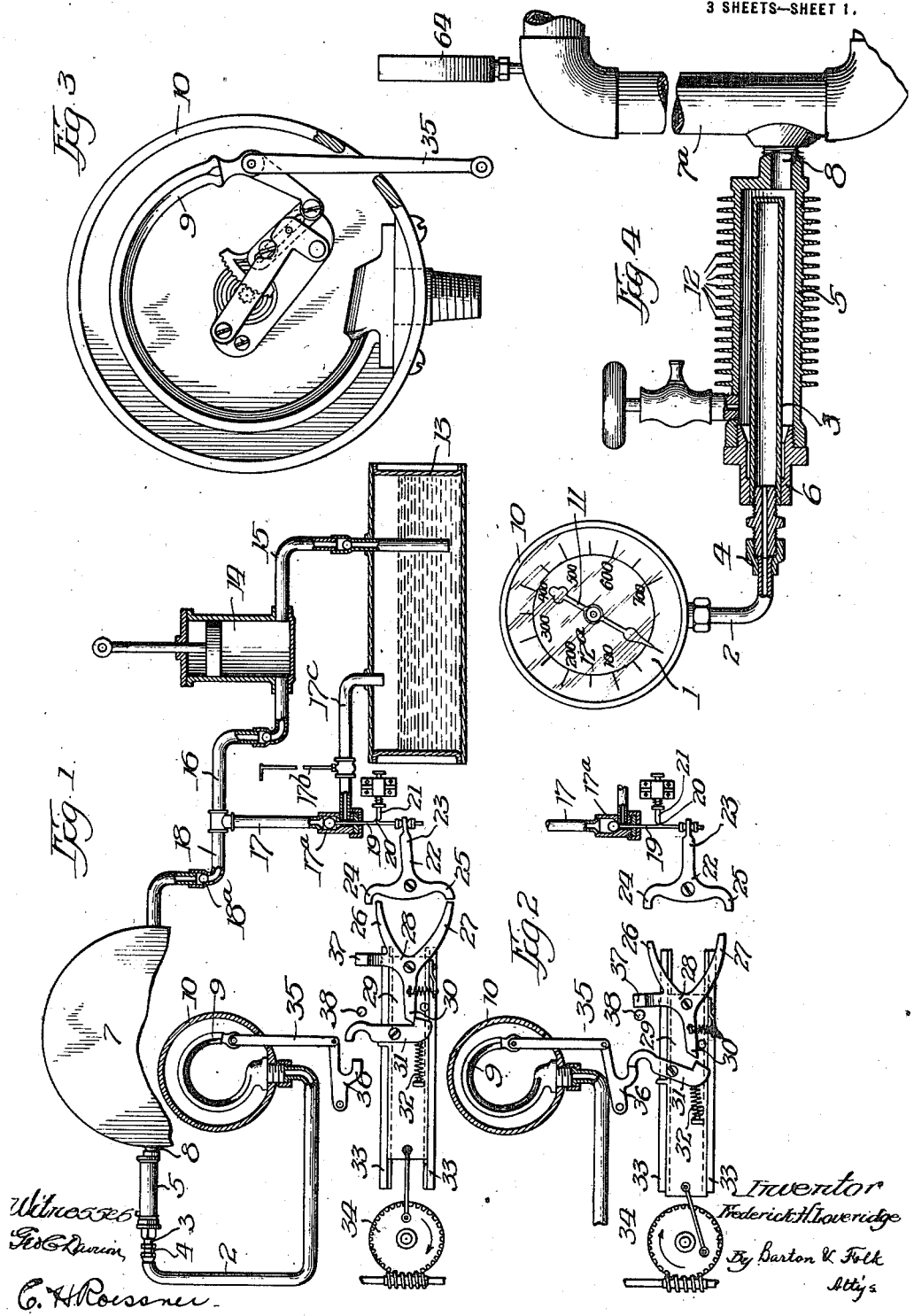

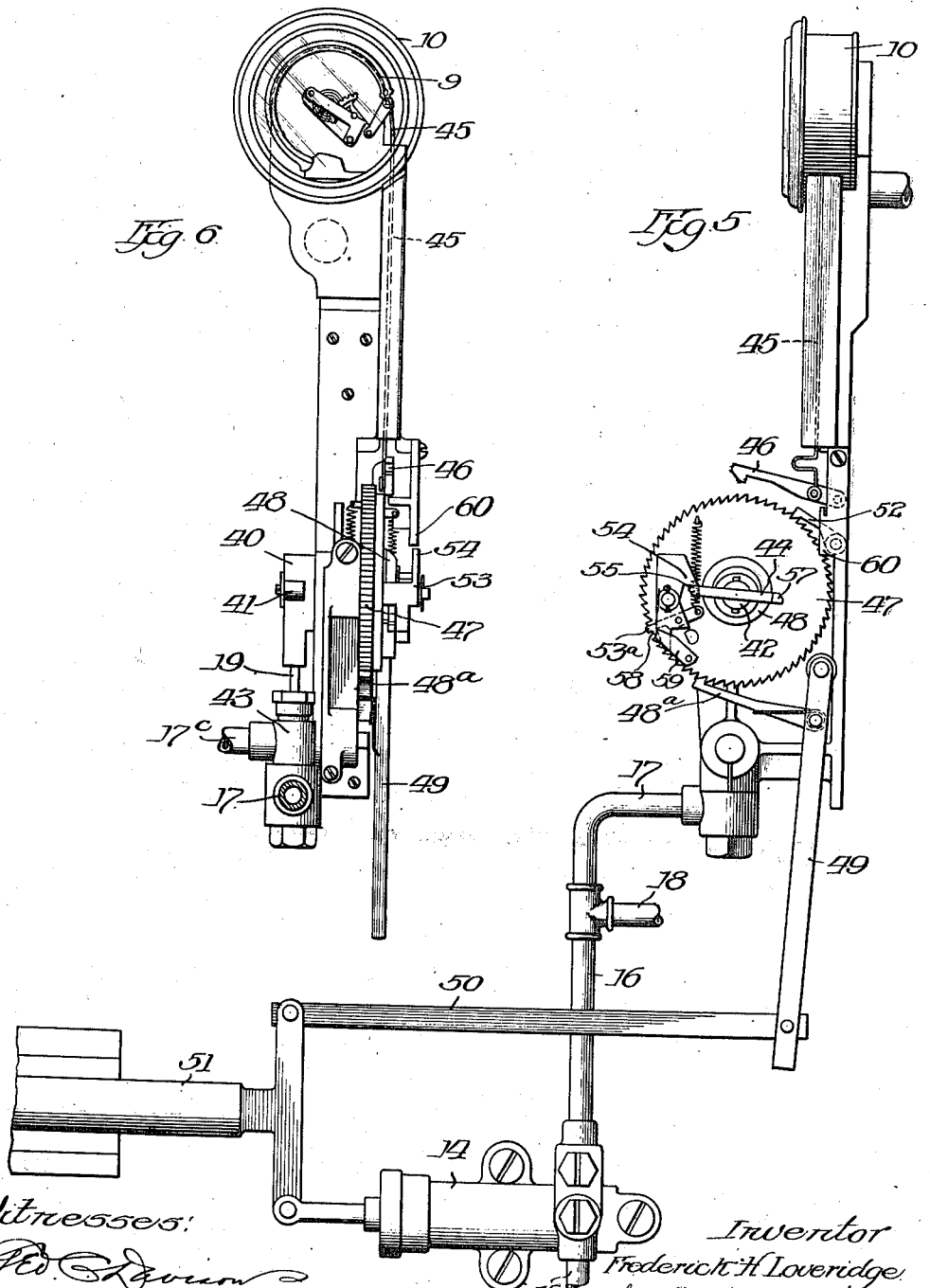

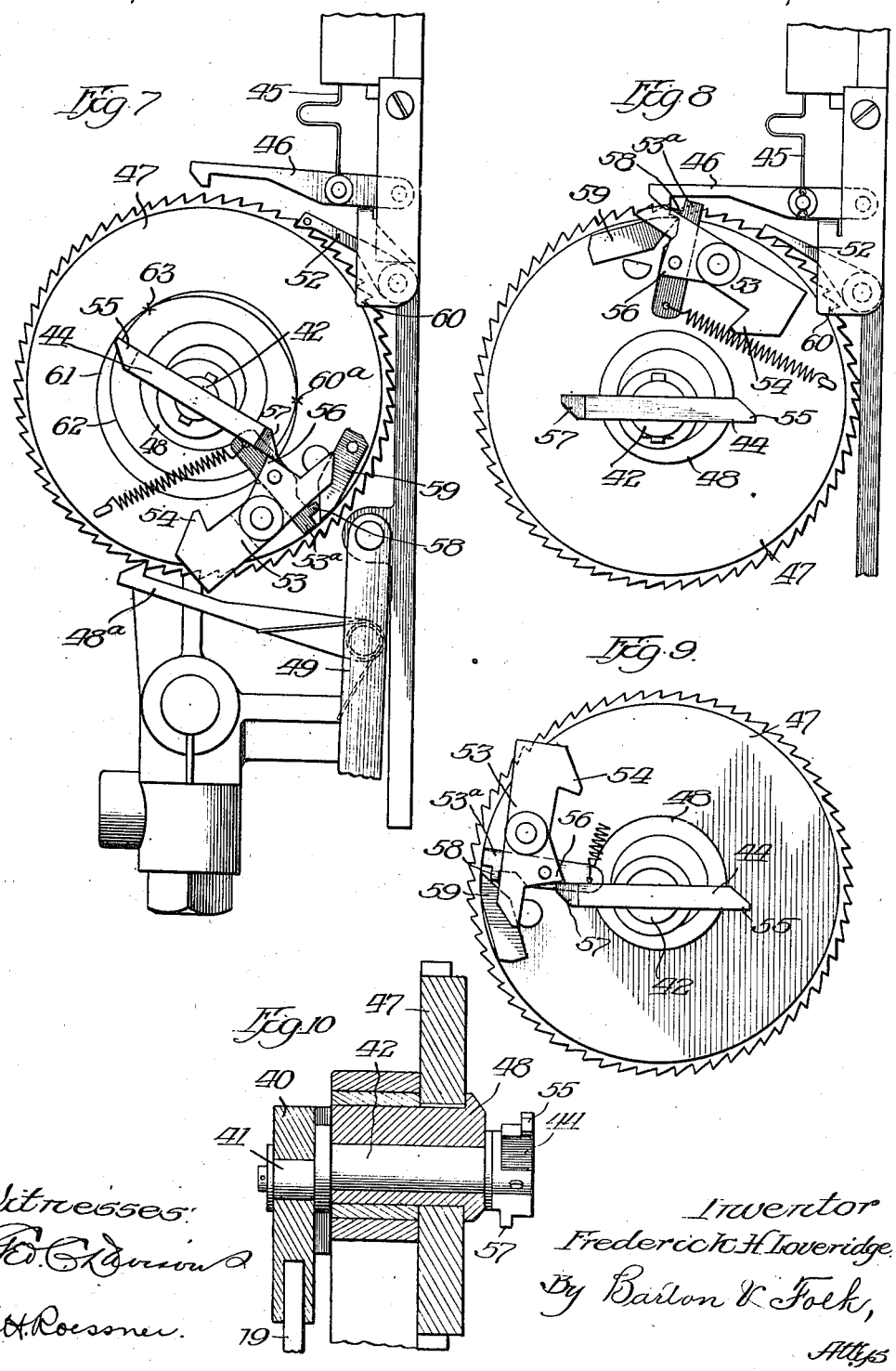

UNITED STATES PATENT OFFICE.

FREDERICK H. LOVERIDGE, OF CHICAGO, ILLINOIS.

PRESSURE-GAGE FOR STEAM-BOILERS.

1,260,925.   Specification of Letters Patent.   Patented Mar. 26, 1918.

Application filed May 10, 1915. Serial No. 26,973.

*To all whom it may concern:*

Be it known that I, FREDERICK H. LOVERIDGE, citizen of the United States, residing at Chicago, in the county of Cook and State of Illinois, have invented a certain new and useful Improvement in Pressure-Gages for Steam-Boilers, of which the following is a full, clear, concise, and exact description.

My invention relates to a pressure gage for steam-boilers, and more particularly to a pressure gage for automobile engines. One of its objects is to provide a simple and accurate device for indicating the height of water in the boiler or of the steam pressure of the boiler. A further object is to provide means automatically operated by the steam pressure for controlling the feed of water to the boiler.

One feature of my invention consists of a closed tube filled or partially filled with a fluid, which, when the water in the boiler falls below a given level, is subjected to the heated steam of the boiler, thereby causing pressure within the closed tube proportional to the pressure of the steam in the boiler. The increase of pressure in the tube may be registered in some well-known manner, as, for example, the closed tube may terminate in a Bourdon tube; or the pressure within the tube may be employed to operate a valve for controlling the admission of feed-water to the boiler; or both functions of the apparatus may be and preferably are combined in the same mechanism.

It is customary in ordinary boiler practice, where steam of moderate working pressures is used, to have a vertical glass tube attached to the boiler at such a position that the level of the water in the boiler is shown by a corresponding level in the glass tube. By this means it is possible to accurately observe the water level in the boiler at all times. It has been found that when steam of very high pressures, as, for example 500 pounds or more, is used that the gage glass becomes impracticable, because of the liability of breakage with the greater fluctuations in temperature and pressure. Hence various means, of varying degrees of accuracy and reliability, have been resorted to to give what might be called indirect or secondary indication of the water level in high pressure boilers.

I have discovered that the most satisfactory method of obtaining an indication of water level in high pressure boilers, such as are commonly used in steam automobiles, is to utilize the principle that saturated steam in a boiler, at a certain pressure, has a certain definite temperature, and conversely. In following out this plan I attach, preferably to the water column, a stub-tube having concentrically placed within it an interior tube closed at one end and connecting through the end of the stub with the Bourdon tube of a pressure gage. The stub-tube being connected at one end to the water column (preferably through a connection made in the lower portion of one end, in order that filling and cooling of water in the stub may be facilitated) will vaporize or tend to vaporize water in the interior tube, so that it will attain a temperature and hence a pressure equivalent to that in the boiler, whenever the stub-tube is filled with saturated steam from the boiler.

In practice I fill the interior tube and connection to the pressure gage with water or other suitable liquid, leaving space enough, however, to allow for expansion of water so that vapor pressure (and not liquid or hydraulic pressure, due to expansion of water under heat), may be indicated on the pressure gage.

By such an arrangement the pressue of steam on the indicator will always be equal to the pressure of steam in the boiler, whenever the level of the water is below that of the stub-tube. When the level of the water is above that of the stub-tube then the contained water will cool down and the temperature of the interior will be correspondingly diminished until at a temperature of 212° no pressure will be indicated.

By placing the stub-tube at a level at which it is desired to maintain water in a boiler the indicator gage will always show whether the water is above or below this level.

To accomplish the automatic maintenance of the water level in the boiler at the point at which the stub-tube is attached, I control a mechanism through the medium of a tripping pawl connected by wire to the Bourdon tube of the indicator. I am thus enabled to obtain an effective construction free from objectionable features, since the interior tube, connection and Bourdon tube form a completely closed, tight and delicately responsive arrangement whereby the level of water in relation to the stub is accurately indicated and the control of the mechanism by the indicator causes accurate and powerful movement of the parts necessary to control the level of water in the boiler.

The several features of my invention may be more readily understood by reference to the accompanying drawings, in which—

Figure 1 is a diagrammatic view, partly in side elevation and partly in vertical section, of one type of mechanism embodying my invention;

Fig. 2 is a detail view of the mechanism shown in Fig. 1 for controlling the feed-water valve, showing the same in its operated position;

Fig. 3 is a front elevation of an ordinary Bourdon gage provided with a connection for operating the feed-water controlling mechanism, the cover of the gage being removed and a portion of the casing being shown in section for clearness of illustration;

Fig. 4 is a longitudinal section through the indicator stub-tube;

Fig. 5 is a front elevation of another type of mechanism for controlling the feed-water valve;

Fig. 6 is an end elevation of the mechanism shown in Fig. 5;

Figs. 7, 8 and 9 are enlarged detailed views of parts of the mechanism shown in Fig. 5, said figures illustrating different positions of operation of the parts; and Fig. 10 is a section through the axis of rotation of the ratchet wheel shown in Figs. 5 to 9, inclusive.

Similar letters of reference refer to similar parts throughout the several views.

The steam pressure gage 1 is provided with a Bourdon tube 9 closed at its outer end. The tube 9 communicates with a tube 2, which in turn is connected by a coupling 4 with a tube 3. The tube 3 is closed at one end, and the open end thereof extends through a collar 6 which forms the closure for the outer end of a stub-tube 5. The tube 3 is thus held within the stub-tube 5 concentrically thereof, the relative sizes of the tubes 3 and 5 being such that space is provided about the tube 3 for the circulation of fluid from a boiler 7. The head of the stub-tube 5 has a threaded tubular extension projecting from its lower portion, providing a passage 8 connecting the interior of the boiler with the interior of the stub-tube. The stub-tube may be attached direct to the boiler, as shown in Fig. 1, or to a water column 7ª, as shown in Fig. 4. The stub-tube 5 is attached at approximately the height at which it is desired to maintain the level of the water in the boiler.

It will be noted that the Bourdon or bent spring tube 9 and the tubes 2 and 3 form sections of a tubular system closed at each end and extending from the interior of the stub-tube 5 to within the casing 10 of the Bourdon gage. This closed tube is filled or partly filled with a fluid, such as water, and the increase of pressure produced by a rise of temperature of the inclosed fluid is registered on the dial of the gage. The mechanism, illustrated in Figs. 3 and 6, by which the motion of the tube 9 is communicated to the index needle 11 of the gage, is of a standard and well-known construction, and hence a detail description thereof is unnecessary.

The stub-tube 5 is preferably provided with heat-radiating fins 12. Since the tube is connected to the interior of the boiler by a single restricted passage 8, the circulation of water between the boiler and the tube, after the tube is once filled with water and while the level of the water in the boiler remains above the level of the tube 5, is so slow that the water in the tube 5 is kept comparatively cool. Under these conditions the liquid in the tube 3 is not heated sufficiently to cause the operation of the index needle 11. Hence, when the boiler is generating steam, and the needle is at its initial position, such position indicates that the water in the boiler is at or above the level of the stub-tube 5, and hence that the water in the boiler 7 is at the desired level.

When the water in the boiler 7 falls below the opening 8, steam enters from the boiler into the stub-tube 5. The steam in said stub-tube will be under the same pressure and will have the same temperature as the steam in the boiler. Said steam will heat the water or other liquid in the tube 3, and convert or tend to convert such liquid into steam, and hence, produce pressure within the closed tube. It is evident that the degree of this pressure will vary with the temperature of the steam in the tube 5, which in turn, has a definite relation to the pressure of the steam in the boiler. The index scale 12ª is so graduated that the operated position of the needle 11 indicates the pressure of the steam in the boiler.

I shall now describe the mechanism through the medium of which the above described gage acts as a means for automatically controlling the supply of feed-water to the boiler. One type of mechanism for performing such additional function is illustrated in Figs. 1 and 2, and certain modifications thereof in Figs. 5 to 10, inclusive.

Referring more particularly to Fig. 1, the boiler 7 is supplied with water from a feed-water tank 13. The means for pumping the water into the boiler may be of any well-known construction, and preferably comprises a system in which a continuously operated pump normally causes a constant circulation of the water from and into the feed-water tank, the feed of the water to the boiler being dependent upon the closure of a valve in the pipe which normally returns the water to said tank. Such a system is shown diagrammatically in Fig. 1, in which a pump 14 is continuously operated in any suitable manner, as, for example, when the boiler is used for generating steam for propelling an automobile, the pump may be driven from the shaft of said machine. The water is drawn into the pump through the pipe 15 and expelled therefrom through the outlet pipe 16. The end of the pipe 16 is connected by a T-coupling with two pipes 17 and 18, provided with valves $17^a$ and $18^a$, respectively, controlling the flow of water to the feed-water tank and to the boiler, respectively. The valve $18^a$ is a gravity valve and is so constructed and arranged that the pressure of the water opens it only when either the valve $17^a$ or a hand-operated valve $17^b$ is closed. The valves $17^a$ and $17^b$ are normally open, and hence the pump 14 normally causes a continuous circulation of water from the tank 13 through the pipes 15, 16, 17 and $17^c$ back to the tank 13.

I will now describe the means whereby the operation of the valve $17^a$ is controlled by the pressure exerted within the spring tube 9 of the Bourdon gage. Referring first to Figs. 1 and 2, the valve $17^a$ is provided with a valve stem 19, having a pointed lug 20 which coöperates with a spring pressed plunger or latch 21 to hold the valve $17^a$ in its operated position. The movement of the stem 19 to open or close the valve $17^a$ is controlled by a bifurcated lever 22 pivotally mounted at its point of bifurcation. The main arm 23 of the lever 22 is connected to the valve stem 19. The arm 23 is moved to close or to open the valve $17^a$ by an arm 24 or an arm 25 of the lever 22 coming into the path of movement of an arm 26 or an arm 27, respectively, of an opposed bifurcated lever 28, which is pivotally mounted upon a reciprocating plate 29. An arm 30 of the lever 28 normally rests upon the end of a supporting trigger 31 which is pivoted upon the plate 29, said trigger being normally held in position to support the end of the lever 30 by a push spring 32. A reciprocating motion of the plate 29 in its guideways 33, is produced by a worm gear 34, or in any other suitable manner.

Pivoted to the free end of the curved spring-tube 9 of the Bourdon gage is one end of a link 35, the other end of which projects through a slot in the casing 10 of the gage and is pivoted to a pivotally mounted trip lever 36. The trip lever 36 is normally out of the path of movement of the trigger 31, as shown in Fig. 1. As the pressure gage is caused to operate, the trip 36 is thrust toward the end of the trigger 31, and is so adjusted that at a predetermined reading of the pressure gage said trip comes into the path of movement of said trigger and causes the same to be withdrawn from the arm 30 of the lever 28, as shown in Fig. 2. When the lever 28 is thus released, its arm 26 is elevated and comes into position to engage the arm 24 of the lever 22, and thus to tilt said lever 22 into the position shown in Fig. 2, thereby closing the valve $17^a$. The valve $17^a$ being closed, the pressure of the water in the pipe 18 opens the valve $18^a$ and the pump 14 supplies water to the boiler 7.

When the water in the boiler rises above the passage 8 and fills the stub-tube 5, the pressure within the gage is reduced and the trip lever 36 is withdrawn from the path of the trigger 31. Upon the next return stroke of the plate 29, a projection 37 of the lever 28 engages a post 38, elevating the arm 30, whereupon the push spring 32 thrusts the end of the trigger 31 beneath said arm 30. Upon the next forward stroke of the plate 29, the arm 27 of the lever 28 engages the arm 25 of the lever 22, tilting said latter lever into the position shown in Fig. 1. The valve $17^a$ is thus opened, and the consequent reduction of presure in the pipe 18 results in the closure of the feed-water supply valve $18^a$.

Figs. 5 to 10, inclusive, show a modification of the mechanism whereby the operation of the valve $17^a$, or its equivalent, is controlled by the pressure exerted within the spring tube 9 of the Bourdon gage. In such modified form the valve stem 19 (see particularly Figs. 6 and 10) is connected to a reciprocatory head 40 which is adapted to be raised or lowered by an eccentric 41 carried upon one end of a spindle 42. Said spindle is adapted to be turned to one or the other of two opposite positions, and thus to open or close the valve which controls the flow of the water through the pipes $17^c$. Said valve may be of the usual well-known type and is mounted in the valve casing 43, the parts being so arranged that the valve is closed in the lifted position of the stem 19 and opened in the lowered position of said stem. The spindle 42 has secured upon one end thereof an adjusting arm 44, which, when turned to one position, will lower the spindle 19 and thereby open the valve and when turned to the opposite position will lift the spindle 19 and thereby close said valve. The means by which said crank arm 44 is adjusted to one of the other positions under the control of the Bourdon tube will now be described.

A wire 45 connects the outer end of the Bourdon tube 9 with a trip-pawl 46 which lies above and slightly in front of a constantly rotating ratchet wheel 47. The ratchet wheel 47 is journaled upon a sleeve 48, within which the spindle 42 is journaled, but, as is shown most clearly in Fig. 10, the axis of rotation of the wheel 47 is eccentric of the axis of rotation of the arm 44. The ratchet 47, during the operation of the engine is constantly rotated by the stepping pawl 48$^a$ carried by a link 49, which is operatively connected by a link 50 to a constantly reciprocating rod 51. (See Fig. 5). Such rod 51 preferably also operates the pump 14. A retaining pawl 52 serves to prevent the backward rotation of the ratchet wheel 47.

Pivotally mounted upon the ratchet wheel 47 near the periphery thereof is a lever 53 having its opposite ends lying in different planes. (See Fig. 6). In one position of said lever the shoulder 54 thereof is adapted to engage a projection 55 of the arm 44, whereas in the other position of said lever the shoulder 56 thereof is adapted to engage a projection 57 at the other end of the arm 44, the projections 55 and 57 likewise being in different planes. Pivotally mounted upon the forward end of the lever 53 is a spring actuated trigger 53$^a$ having a hook 58 adapted to engage over a post 59 secured upon the ratchet wheel 47. When the trigger is in its set position the hook 54 of the lever 53 is lowered into operative relation with respect to the arm 44, whereas when the trigger is tripped the hook 56 is lowered into operative relation with respect to said arm. Thus the trigger 53$^a$ determines which one of the hooks 54 and 56 will control the position of the arm 44, as will presently be more fully described.

During each rotation of the ratchet wheel 47 the lever 53 passes beneath a post 60 which engages the rear end of said lever and raises the forward end so that the hook 58 engages over the post 59. The free end of the trip pawl 46 lies in the path of movement of the trigger 53$^a$ and will trip said trigger provided the trip lever is in its lowered position, but will leave the trigger untripped provided the trip lever is in its elevated position. When the water level in the boiler is at the required height, the Bourdon tube is in its unoperated position, as has been hereinbefore described, and hence the trip pawl 46 is in its lowered position. In such case the trigger 53$^a$ is tripped by the pawl 46, thereby throwing the shoulder 56 in such position that it will cause the arm 44 to assume such a position that valve 17$^a$ will be open to permit the water to pass through the pipes 17$^c$ back to the feed tank. If, however, the water in the boiler is below the proper level, the Bourdon tube is actuated, and, through the wire 45, lifts the trip pawl 46, thereby leaving the trigger 53$^a$ in engagement with the stop 59 and holding said lever 53 in such position that the shoulder 54 thereof will maintain the arm 44 in its alternative position, that is, in such position that it will cause the valve 17$^a$ to assume a closed position, whereupon water will be pumped through the pipe 18 into the boiler, as hereinbefore described.

Assuming that by a previous operation the arm 44 has been moved to the position shown in Fig. 8, which is the position for closing the valve 17$^a$, and hence for pumping water into the boiler. When the required water level in the boiler is reached, the Bourdon tube permits the trip pawl 46 to drop down to the position shown in Fig. 8, whereupon the trigger 53$^a$ is released and the shoulder 56 is brought into position to engage the projection 57 of the lever 44, upon the further advance movement of the ratchet wheel, as shown in Fig. 9. In Fig. 7, the arm is shown as being moved toward its reversed position, it being understood that when the shoulder 56 has turned the projection 57 to the point indicated at 60$^a$ in Fig. 7, said shoulder will ride off of the end of said projection, owing to the eccentric mounting of said ratchet wheel 47 and arm 44. Thereafter, so long as the trip-lever is in its lowered position, the trigger 53$^a$ will be tripped each time it is reset, thus maintaining the shoulder 54 out of operative position, and since the shoulder 56 has moved the arm around to a position at which said shoulder does not engage said arm, the arm remains in position to hold open the valve controlled by it.

Assuming, on the other hand, that the arm has been moved to the position for holding the valve opened, as just described, and the water in the boiler falls below the proper level. Thereupon the trip pawl 46 is raised to the position shown in Fig. 5, and the trigger is not tripped. The shoulder 54 is now in position to engage the projection 55 of the arm 44 (see Fig. 5) and move said projection around to the point 60 before being released from the same. In Fig. 7 the circle 61 represents the path traversed by the extreme ends of the projections 55 and 57, and the circle 62 represents the path traversed by the extreme end of the shoulders 54 and 56 when said shoulders are, respectively, in their operative positions. It will be noted that said circles intersect at 60$^a$ and at 63, and hence the shoulders 54 and 56, which are in the same planes as the projections 55 and 57, respectively, will, in their operative positions, have a path of movement 62 which lies inside of the circle 61 between the points 63 and 60$^a$ and outside of said circle between the points 60$^a$ and 63. It is obvious, therefore, that with one of said shoulders in its operative position the arm 44 will be made to assume one of its alternative positions and that upon the other shoulder being brought into operative position the arm will be made to assume its other position. The position of said arm 44 and hence the operation of the valve 17ª is thus automatically controlled by the Bourdon tube 9.

The combination by means of which the Bourdon tube acts as an indicator as well as to control the feed of water to the boiler is of prime importance and serves several purposes. For example, in a steam automobile the placing of the indicator so as to be seen by the driver enables him to know whether the water in the boiler is above or below the stub-tube. It frequently happens that in approaching a special running condition that it will be desirable to maintain the water in the boiler above the normal quantity so that there may be an extra reserve. The driver, knowing the condition of water level, is then able to increase the quantity of water if he so desires by the use of the hand-controlled auxiliary valve 17ᵇ, hereinbefore described.

If it is desired to remove the water (or fluid) from the interior tube, connection and Bourdon tube at any time, it may be done, and when it is desired to put the device in working condition again the Bourdon tube, acting as an indicator, will show if the proper amount of water (or fluid) is present in the tubular control system. If, through accident, the proper amount of such water (or fluid) should not be present, then the indicator furnishes a convenient and ready means for testing and restoring to the proper normal working condition. By comparison of indicator 1 with the usual steam gage 64 (see Fig. 4), a check on the condition and proper operation of the device, of great practical value, is secured.

What I claim is:

1. The combination with a steam-boiler, of a stub-tube communicating at one end with the interior of said boiler at approximately the lowest desired level of the water in said boiler, a closed tube containing a fluid, said closed tube having one of its ends inclosed by said stub-tube and having its opposite end terminating in a Bourdon tube, mechanism, responsive to the operation of said Bourdon tube, for controlling the feed of water to said boiler, and indicator mechanism, operated by said Bourdon tube, for indicating whether the water in said boiler is up to the desired level and also for indicating the pressure of steam in said boiler when the water is below said desired level.

2. The combination with a steam-boiler, of a stub-tube having the lower portion of one of its ends in communication with the interior of said boiler at approximately the lowest desired level of water in said boiler, a closed tube containing a fluid, said closed tube having one of its ends inclosed by said stub-tube, indicator mechanism responsive to vapor pressure within said tube for indicating whether the water in said boiler is up to the desired level and also indicating the pressure of steam in said boiler when the water is below said desired level, and mechanism likewise responsive to vapor pressure in said tube for controlling the feed of water to said boiler.

3. The combination with a steam-boiler, of a closed tube containing a fluid, said closed tube terminating at one end in a Bourdon tube and having its opposite end in communication with the interior of said boiler at approximately the lowest desired level of water in said boiler, a feed-water supply system provided with a valve for controlling the flow of water to said boiler, a movable arm having alternative positions for opening or closing said valve respectively, a constantly moving part, a shiftable member carried by said moving part and having alternative positions adapted to move said movable arm into a corresponding position, and means controlled by said Bourdon tube for governing the actuation of said shiftable member.

4. The combination with a steam-boiler, of a closed tube containing a fluid, said closed tube terminating at one end in a Bourdon tube and having its opposite end in communication with the interior of said boiler at approximately the lowest desired level of the water in said boiler, a feed-water supply system provided with a valve for controlling the flow of water to said boiler, a pivoted arm having alternative positions for opening or closing said valve respectively, a constantly moving part, a pivoted lever carried by said moving part and having alternative positions adapted to move said arm into a corresponding position, a trigger mounted on said moving part and supporting said pivoted lever in one of its positions, and a trip pawl operatively connected to said Bourdon tube and arranged at a predetermined position of said Bourdon tube to be moved into the path of said trigger.

In witness whereof, I hereto subscribe my name this 7th day of May, A. D., 1915.

FREDERICK H. LOVERIDGE.